(12) United States Patent
D'Errico et al.

(10) Patent No.: US 6,559,212 B1
(45) Date of Patent: *May 6, 2003

(54) PLASTICIZED POLYVINYL BUTYRAL AND SHEET

(75) Inventors: John J. D'Errico, Clastonbury, CT (US); Berkeley A. Jemmott, Springfield, MA (US); Mary S. Krach, Longmeadow, MA (US); James R. Moran, Longmeadow, MA (US)

(73) Assignee: Monsanto Company, St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/580,952

(22) Filed: Dec. 29, 1995

(51) Int. Cl.⁷ .......................... C08K 5/10; C08K 5/101
(52) U.S. Cl. .................. 524/317; 428/411.1; 428/437; 524/315; 525/61
(58) Field of Search ................ 524/308, 315, 524/317; 525/61; 428/411.1, 437

(56) References Cited

U.S. PATENT DOCUMENTS

| | | | |
|---|---|---|---|
| 2,274,672 A | 3/1942 | Dennison et al. | 49/81.5 |
| 2,453,569 A * | 11/1948 | Debacher | 524/317 X |
| 2,453,570 A * | 11/1948 | Debacher | 524/317 |
| 2,492,512 A * | 12/1949 | Zweig | 524/317 X |
| 2,526,728 A | 10/1950 | Burk et al. | |
| 2,637,706 A * | 5/1953 | Bergstedt et al. | 524/317 X |
| 3,271,235 A | 9/1966 | Lavin et al. | 428/437 |
| 3,361,699 A * | 1/1968 | Mattimoe et al. | 524/317 |
| 3,551,281 A | 12/1970 | Takaura et al. | 428/437 |
| 3,590,991 A | 7/1971 | Sloan | |
| 3,679,788 A * | 7/1972 | Kiyono et al. | 264/211 |
| 3,838,091 A | 9/1974 | Kanno et al. | |
| 3,855,055 A | 12/1974 | Kanno et al. | |
| 3,884,865 A | 5/1975 | Fariss et al. | |
| 4,020,217 A * | 4/1977 | Karasudani et al. | 428/429 |
| 4,161,565 A | 7/1979 | Hermann et al. | |
| 4,276,351 A | 6/1981 | Phillips | |
| 4,390,594 A | 6/1983 | Dages | 428/437 |
| 4,452,935 A * | 6/1984 | Nomura et al. | 524/290 |
| 4,600,655 A | 7/1986 | Hermann et al. | |
| 4,663,235 A | 5/1987 | Fock et al. | |
| 4,751,266 A | 6/1988 | Hermann et al. | |
| 4,935,272 A | 6/1990 | Leboeuf | |
| 4,942,102 A * | 7/1990 | Keys et al. | 430/1 |
| 5,434,207 A | 7/1995 | Fischer | |

FOREIGN PATENT DOCUMENTS

| | | |
|---|---|---|
| EP | 0 024 723 A1 | 3/1981 |
| EP | 1 022 261 A1 | 7/2000 |
| JP | 50-30467 | 9/1976 |
| JP | 53-28303 | 8/1978 |
| JP | 58-025376 | 5/1983 |
| JP | 58-46266 | 10/1983 |
| JP | 61-46425 | 10/1986 |
| JP | 01252556 | 9/1989 |
| JP | 3-154639 | 6/1991 |
| JP | 57-72284 | 7/1991 |
| JP | 5004841 * | 1/1993 |
| JP | 7-172878 | 7/1995 |

* cited by examiner

*Primary Examiner*—Judy M. Reddick
(74) *Attorney, Agent, or Firm*—Banner & Witcoff, Ltd.

(57) ABSTRACT

Polyvinyl butyral resin and sheet having a hydroxyl content less than 19.5, preferably about 17 to 19 weight %, calculated as polyvinyl alcohol, plasticized with a compatible amount of triethylene glycol di-2-ethylhexanoate.

19 Claims, 1 Drawing Sheet

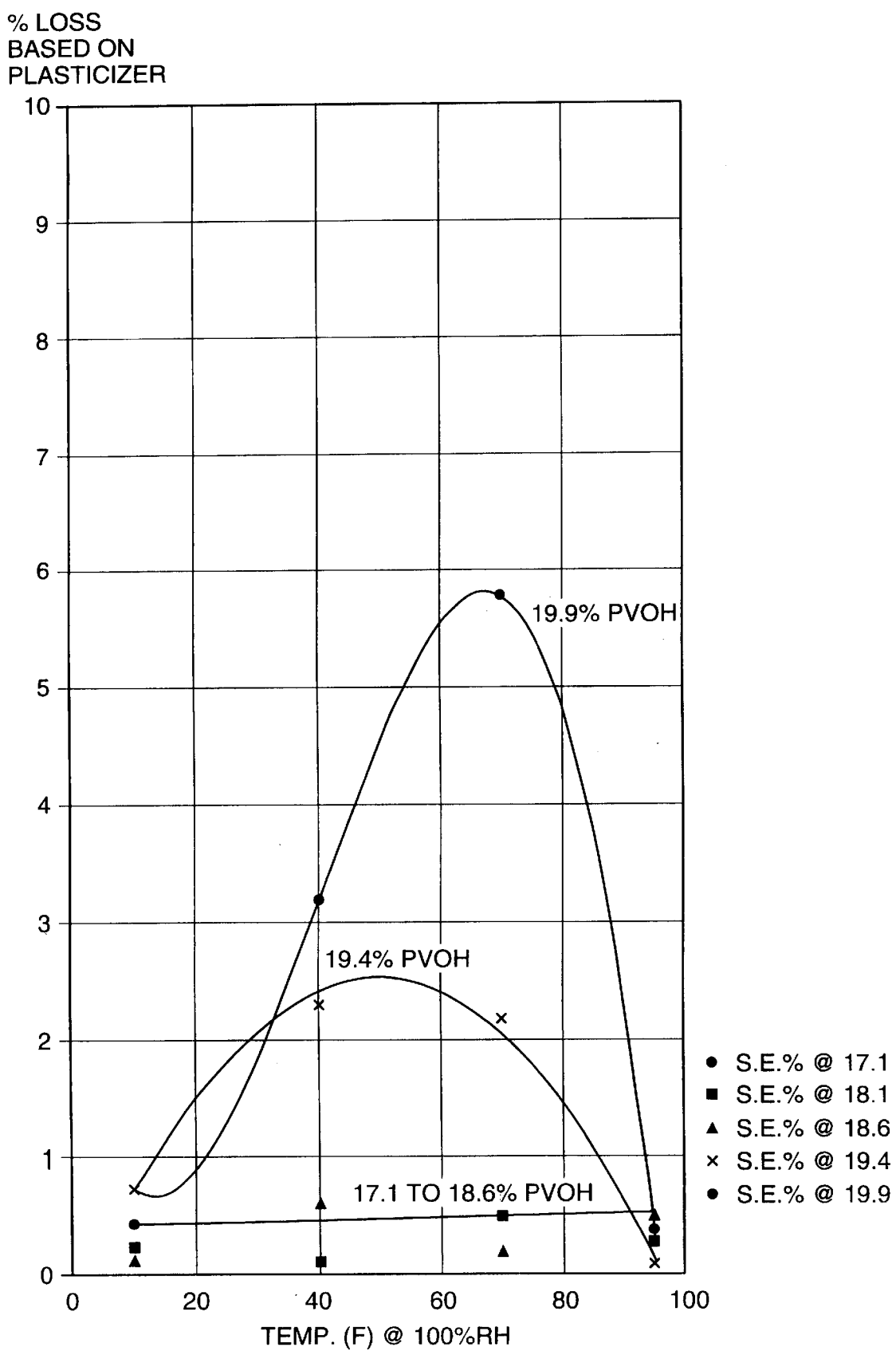

PLASTICIZED POLYVINYL BUTYRAL AND SHEET

BACKGROUND OF THE INVENTION

This invention relates to plasticized polyvinyl butyral (PVB) and more particularly PVB sheet containing compatible plasticizer.

Plasticized PVB sheet is used in light-transmitting laminates containing one or more rigid layers, such as glass, for applications such as building and vehicle windows, show cases, protective glass for pictures, documents and the like. The plasticized sheet absorbs energy and prevents disintegration when, for example, the head of a vehicle occupant strikes the rigid layer of a laminate window after a sudden stop or a foreign object is propelled against the outside of the laminate. The PVB resin contains hydroxyl groups in the polymer chain to promote adhesion to glass.

The plasticizer must be carefully chosen to contribute to a balance of performance properties in the laminate. Cost/benefit performance continues of importance in assessing plasticized PVB for safety laminates having valuable commercial properties.

SUMMARY OF THE INVENTION

Now plasticized PVB formulations have been developed exhibiting improved plasticizer and PVB compatibility (affinity of resin and plasticizer for each other) in comparison with prior art systems.

Accordingly, a principal object of this invention is to provide plasticized PVB formulations exhibiting improved compatibility of plasticizer with PVB resin.

Another object is to provide a compatible plasticized PVB formulation wherein the plasticizer is synthesized from readily available, relatively inexpensive starting materials.

These objects are achieved by polyvinyl butyral resin having a hydroxyl content of less than 19.5, preferably about 17 to 19 weight % calculated as polyvinyl alcohol plasticized with a compatible amount of triethylene glycol di-2-ethylhexanoate (3GEH).

Also provided is a sheet formed of this composition.

BRIEF DESCRIPTION OF THE DRAWING

In describing the overall invention, reference is made to the accompanying drawing which is a graphical representation of the compatibility of 3GEH with PVB at various polyvinyl alcohol (PVOH) contents in the PVB.

DETAILED DESCRIPTION

Triethyleneglycol di-2-ethylhexanoate in the PVB formulation plasticizes the PVB resin. The resin-compatible effective amount depends on properties desired in the laminate application. Generally 35 to 45 parts plasticizer per 100 parts PVB resin (PPHR) are used.

Compatibility of plasticizer and resin is important in maintaining the integrity of the sheet in its interlayer application between glass layers in a safety laminate on exposure to all the various conditions the laminate and interlayer might encounter in use. If plasticizer loss by exudation from the sheet is too great, laminate performance is adversely affected insofar as increasing the glass transition temperature of the sheet composition and reducing laminate impact performance.

PVB resin has a weight average molecular weight greater than 70,000, preferably about 100,000 to 250,000, as measured by size exclusion chromatography using low angle laser light scattering. On a weight basis PVB typically comprises less than 19.5%, preferably about 17 to 19% hydroxyl groups calculated as polyvinyl alcohol (PVOH); 0 to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954, issued Aug. 11, 1992.

PVB resin is produced by known aqueous or solvent acetalization processes reacting PVOH with butyraldehyde in the presence of acid catalyst, followed by neutralization of the catalyst, separation, stabilization and drying of the resin. It is commercially available from Monsanto Company as Butvar® resin.

Plasticized PVB as sheet at a non-critical thickness of about 0.13 to 1.3 mm is formed by mixing resin and plasticizer and preferably (in commercial systems) extruding the mixed formulation through a sheet die, i.e. forcing molten, plasticized PVB through a horizontally long vertically narrow die opening substantially conforming in size to the sheet being formed, or by casting molten polymer issuing from an extrusion die onto a die roll in close proximity to the die exit to impart desired surface characteristics to one side of the polymer. When the roll surface has minute peaks and valleys, the side of the sheet contacting the roll will have a rough surface generally conforming to the valleys and peaks. Roughness on the other side can be provided by the design of the extrudate die opening as shown, for example, in FIG. 4 of U.S. Pat. No. 4,281,980. Other known techniques for producing a rough surface on one or both sides of an extruding sheet involve specifying and controlling one or more of the following: polymer molecular weight distribution, water content and temperature of the melt. These techniques are disclosed in U.S. Pat. Nos. 2,904,844; 2,909,810; 3,994,654; 4,575,540 and European Patent No. 0185,863. Embossing downstream of the extrusion die also roughens the sheet surface. As known, this roughness is temporary to facilitate deairing during laminating after which the elevated temperature and pressure during bonding of the sheet to glass melts it smooth. Lamination to glass is according to generally known procedures.

Sheet of the invention optionally contain additives to enhance performance such as dyes, pigments, ultraviolet light stabilizers, antioxidants, adhesion control salts and the like.

The following Examples illustrate and do not limit or restrict the invention. Amounts and percentages are in weight.

Properties reported in Examples are measured substantially in accordance with the following procedures.

PVB Residual Hydroxyl (% PVOH): ASTM 1396.

Spontaneous Exudation—(S.E.) Measures plasticizer—PVB resin compatibility at the extremes of expected operating temperatures and humidity. Blend plasticizer and PVB formulated (in terms of plasticizer amount) to a glass transition temperature Tg of 31 +/−1° C. for 8 minutes at 150° C. in a Brabender mixer equipped with sigma blades turning at 50 rpm. Using a heated hydraulic press (149° C., 5.5 MPa for 5 min.), press the plasticized PVB into 0.76 mm thick sheets, cut into 17.5×38 mm samples, dry for 5 days in a desiccator and weigh to get dry weight. Place samples in a wet desiccator (enclosed chamber containing water to create 100% RH) held at various temperatures for 7 days.

Lightly wipe exuded plasticizer from sample surfaces to remove exuded plasticizer and then dry the samples in a desiccator for 5 days. Calculate weight loss as % of initial plasticizer weight as spontaneous exudation.

EXAMPLES 1–5

Blend PVB resin having the noted PVB residual hydroxyl content with various amounts of liquid 3 GEH plasticizer, form into sheet and test for compatibility using the Spontaneous Exudation test. Formulate (parts plasticizer per 100 parts PVB resin) to give 31 +/−1° C. Tg. Results are in Table 1 and (S.E.) the drawing.

TABLE 1

| Example | PPHR | % PVOH |
|---|---|---|
| 1 | 37.6 | 17.1 |
| 2 | 39.2 | 18.1 |
| 3 | 40.2 | 18.6 |
| 4 | 41.7 | 19.4 |
| 5 | 43.1 | 19.9 |

The spontaneous exudation results shown in the drawing of Exs. 1–3 compared with Exs. 4,5 illustrate the unexpected compatibility of 3GEH plasticizer with PVB resin species over the narrow range of 17.1 to 18.6% PVOH insofar as exhibiting less than 1% plasticizer loss across the entire spectrum of temperatures and humidity likely to be encountered by PVB sheet in commercial use. Though the graph of the drawing suggests that heating the compositions of Exs. 4, 5 to elevated temperature, e.g. about 95° F. (35° C.) would avoid excessive exudation, this cannot be done in commercial practice since at such high temperature abutting layers of plasticized sheet in storage will stick to each other (block). Less than 3% loss is considered the maximum upper limit which should occur at less than 19.5 PVOH. Preferred PVOH level is equal or less than 19%, for example about 17 to 19%.

EXAMPLES 6–9

Sheet of various 3GEH plasticized PVB formulations was stored in roll form at 50° F. (10° C.) for about 9 months in a warehouse at sheet moisture content of about 0.4 to 0.6%. The sheet formulations were:

TABLE 2

| Example | PPHR | % PVOH |
|---|---|---|
| 6 | 41 | 18.3 |
| 7 | 39.5 | 18.6 |
| 8 | 44 | 20.0 |
| 9 | 42 | 20.3 |

When these rolls were unwound and examined visually, the sheet of Example 8, 9 had an unacceptable surface film of plasticizer as compared with that of Examples 6, 7 which had none. This confirms in commercial use the lab results of Examples 1–5.

The preceding description is for illustration only and not to be taken in a limited sense. Various modifications and alterations will be suggested to persons skilled in the art. The foregoing, therefore, is exemplary only and the scope of the invention is to be ascertained from the following claims.

We claim:

1. Thermoplastic polyvinyl butyral resin having a hydroxyl content of 17 to 19.4 weight % calculated as polyvinyl alcohol, plasticized with "35 to 45 parts per 100 parts polyvinyl butyral resin" of triethylene glycol di-2-ethylhexanoate.

2. The plasticized polyvinyl butyral resin of claim 1 wherein the hydroxyl content is 17 to 19 weight % calculated as polyvinyl alcohol.

3. A sheet formed of thermoplastic polyvinyl butyral resin having a hydroxyl content of 17 to 19.4 weight % calculated as polyvinyl alcohol, plasticized with "35 to 45 parts per 100 parts polyvinyl butyral resin" of triethylene glycol di-2-ethylhexanoate.

4. The sheet of claim 3 wherein the hydroxyl content is 17 to 19 weight % calculated as polyvinyl alcohol.

5. Thermoplastic sheet consisting of polyvinyl butyral resin having a hydroxyl content of 17 to 19.4 weight % calculated as polyvinyl alcohol, plasticized with a polyvinyl butyral compatible amount of triethylene glycol di-2-ethylhexanoate.

6. Thermoplastic sheet formed of polyvinyl butyral resin having a hydroxyl content of 17 to 19.4 weight % calculated as polyvinyl alcohol, plasticized with 35 to 45 parts per 100 parts polyvinyl butyral resin of triethylene glycol di-2-ethylhexanoate.

7. The sheet of claim 5 having a thickness of 0.13 to 1.3 mm.

8. The sheet of claim 6 having a thickness of 0.13 to 1.3 mm.

9. The plasticized polyvinyl butyral resin of claim 1, wherein the hydroxyl content is 17.1 to 18.6 weight % calculated as polyvinyl alcohol.

10. The sheet of claim 3, wherein the hydroxyl content is 17.1 to 18.6 weight % calculated as polyvinyl alcohol.

11. The thermoplastic sheet of claim 5, wherein the hydroxyl content is 17.1 to 18.6 weight % calculated as polyvinyl alcohol.

12. The thermoplastic sheet of claim 6, wherein the hydroxyl content is 17.1 to 18.6 weight % calculated as polyvinyl alcohol.

13. The plasticized polyvinyl butyral resin of claim 1 wherein the resin has weight average molecular weight greater than 70,000.

14. The plasticized polyvinyl butyral resin of claim 1 wherein the resin has a weight average molecular weight from about 100,000 to about 250,000.

15. The sheet of claim 3 wherein the resin has weight average molecular weight greater than 70,000.

16. The sheet of claim 3 wherein the resin has a weight average molecular weight from about 100,000 to about 250,000.

17. The plasticized polyvinyl butyral "sheet of claim 6 wherein said resin has a" hydroxyl content is 18.1 to 18.6 weight % calculated as polyvinyl alcohol.

18. The plasticized polyvinyl butyral sheet of claim 6 wherein said resin has a weight average molecular weight of from about 100,000 to 250,000.

19. The plasticized polyvinyl butyral sheet of claim 17 wherein said resin has a weight average molecular weight of from about 100,000 to 250,000.

* * * * *